United States Patent
Hiasa

(10) Patent No.: US 12,061,672 B2
(45) Date of Patent: Aug. 13, 2024

(54) IMAGE PROCESSING METHOD, IMAGE PROCESSING APPARATUS, LEARNING METHOD, LEARNING APPARATUS, AND STORAGE MEDIUM

(71) Applicant: CANON KABUSHIKI KAISHA, Tokyo (JP)

(72) Inventor: Norihito Hiasa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 17/465,716

(22) Filed: Sep. 2, 2021

(65) Prior Publication Data
US 2022/0076071 A1   Mar. 10, 2022

(30) Foreign Application Priority Data

Sep. 10, 2020 (JP) ................................ 2020-152151

(51) Int. Cl.
| | | |
|---|---|---|
| *G06V 10/70* | (2022.01) | |
| *G06F 18/2132* | (2023.01) | |
| *G06F 18/214* | (2023.01) | |
| *G06N 20/00* | (2019.01) | |
| *G06T 3/40* | (2006.01) | |
| *G06V 10/20* | (2022.01) | |

(52) U.S. Cl.
CPC ...... *G06F 18/2148* (2023.01); *G06F 18/2132* (2023.01); *G06N 20/00* (2019.01); *G06T 3/40* (2013.01); *G06V 10/70* (2022.01); *G06V 10/20* (2022.01)

(58) Field of Classification Search
CPC . G06F 18/2148; G06F 18/2132; G06N 20/00; G06T 3/40
See application file for complete search history.

(56) References Cited

U.S. PATENT DOCUMENTS

| | | | | |
|---|---|---|---|---|
| 9,459,825 | B2 * | 10/2016 | Tahan | ....................... G06F 3/14 |
| 10,812,739 | B2 * | 10/2020 | Takahashi | ............ H04N 23/661 |
| 2010/0128983 | A1 * | 5/2010 | Sugai | ................... G06V 10/245 |
| | | | | 382/173 |
| 2018/0075581 | A1 * | 3/2018 | Shi | ......................... G06N 3/045 |

(Continued)

FOREIGN PATENT DOCUMENTS

| | | | | |
|---|---|---|---|---|
| WO | WO-2018123360 | A1 * | 7/2018 | ......... H04N 5/23206 |
| WO | 2019030615 | A1 | 2/2019 | |

OTHER PUBLICATIONS

Upchurch, Paul, et al. "Deep feature interpolation for image content changes." Proceedings of the IEEE conference on computer vision and pattern recognition. 2017.*

(Continued)

*Primary Examiner* — Shefali D Goradia
(74) *Attorney, Agent, or Firm* — Canon U.S.A., Inc. IP Division

(57) ABSTRACT

A method for processing an image uses a generator which is a machine learning model. The generator converts an input low resolution image into a first feature map. From the first feature map, a first intermediate image and a second intermediate image each having resolution higher than resolution of the low resolution image are generated. Based on the first intermediate image and the second intermediate image, an estimated image having higher resolution than the resolution of the low resolution image is generated.

20 Claims, 12 Drawing Sheets

(56) References Cited

U.S. PATENT DOCUMENTS

2019/0149752 A1\* 5/2019 Takahashi .............. H04N 23/80
  348/222.1
2021/0067735 A1\* 3/2021 Reda ...................... G06N 3/045

OTHER PUBLICATIONS

Upchurch Paul et al; "Deep Feature Interpolation for Image Content Changes;" 2017 IEEE Conference on Computer Vision and Pattern Recognition; pp. 6090-6099.
Jorn-Henrik Jacobsen et al; "i-REVNET: Deep Invertible Networks;" Published as a conference paper at ICLR 2018; Feb. 20, 2018; University of Amsterdam; pp. 1-11.
Logan Engstrom et al; "Adversarial Robustness as a Prior for Learned Representations;" Sep. 27, 2019; pp. 1-25.
Wang, et al; "Deep Network Interpolation for Continuous Imagery Effect Transition;" CVPR paper is the Open Access version, provided by the Computer Vision Foundation (CVP); 2019; pp. 1692-1701.

\* cited by examiner

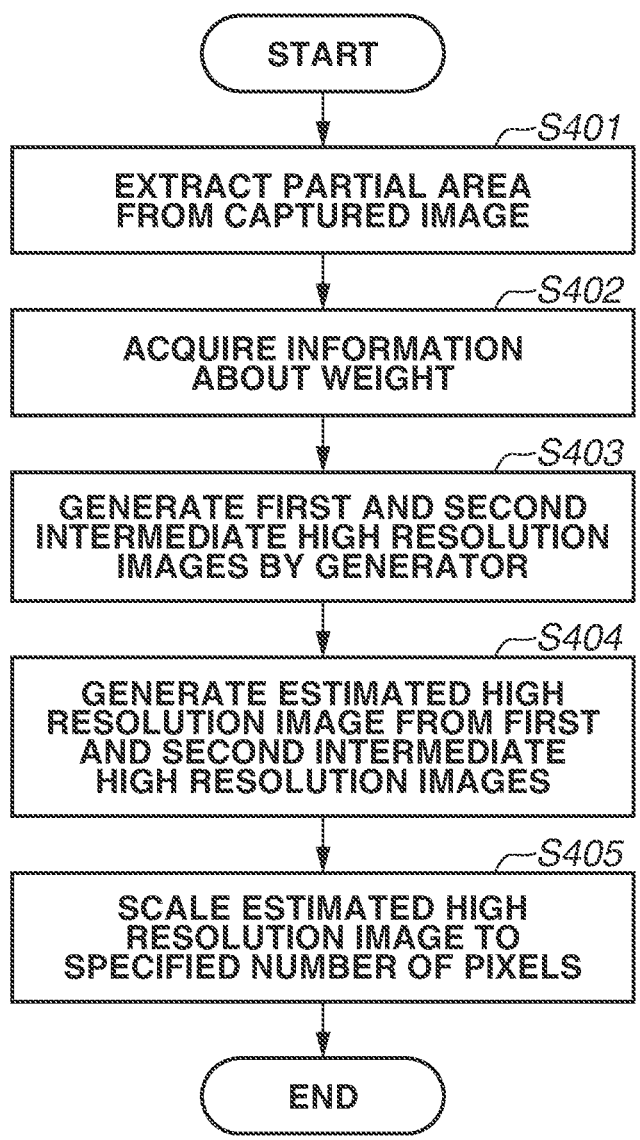

IMAGE PROCESSING METHOD, IMAGE PROCESSING APPARATUS, LEARNING METHOD, LEARNING APPARATUS, AND STORAGE MEDIUM

BACKGROUND OF THE INVENTION

Field of the Invention

The present invention relates to a technique for performing resolution enhancement on an image using a machine learning model.

Description of the Related Art

United States Patent Application Publication No. 2018/0075581 discusses a method for performing resolution enhancement on an image using a machine learning model referred to as a generative adversarial network (GAN). The method is referred to as a super resolution GAN (SRGAN). The SRGAN performs learning using a generator which generates a high resolution image and a discriminator which discriminates whether an input image is an image generated by the generator or an actual high resolution image. The actual high resolution image means a high resolution image which is not generated by the generator.

The generator learns a weight so that a high resolution image to be generated and an actual high resolution image cannot be discriminated by the discriminator. Accordingly, the generator can generate a high resolution image which has a high resolution texture and a more natural appearance. However, at the same time, there is an issue that a false structure which subjectively causes a feeling of strangeness may appear.

In this regard, a method for controlling appearance of a false structure and perceived resolution is discussed in Xintao Wang, et al., Deep Network Interpolation for Continuous Imagery Effect Transition, Proceedings of the IEEE/CVF Conference on Computer Vision and Pattern Recognition (CVPR), 2019, pp. 1692-1701. According to the method discussed by Xintao Wang, et al, a weighted mean of a weight of a generator which has learned resolution enhancement without using a discriminator (the false structure is few, but the perceived resolution is low) and a weight of a generator which has learned the resolution enhancement using a discriminator (equivalent to the SRGAN, the perceived resolution is high, but the false structure may exist) is calculated. A high resolution image is generated by a generator using the weighted mean as a weight. This method is referred to as network interpolation. A balance of an appearance of a false structure and perceived resolution can be controlled by changing the weight of the weighted mean.

As a result of study made by the present inventor, it is found that a generator which performs the network interpolation based on the method discussed by Xintao Wang et al. may cause image quality degradation, such as multiple edges in which an object is displayed doubly or color change, in a high resolution image to be generated.

The present invention is directed to provision of a high quality image based on resolution enhancement of an image using a machine learning model.

SUMMARY OF THE INVENTION

According to an aspect of the present invention, a method for processing an image includes converting an input low resolution image into a first feature map and generating a first intermediate image and a second intermediate image from the first feature map, the first intermediate image and the second intermediate image each having resolution higher than resolution of the low resolution image, by using a generator which is a machine learning model, and generating an estimated image having higher resolution than the resolution of the low resolution image based on the first intermediate image and the second intermediate image.

Further features of the present invention will become apparent from the following description of exemplary embodiments (with reference to the attached drawings).

BRIEF DESCRIPTION OF THE DRAWINGS

FIG. 12 is a flowchart illustrating generation of an estimated high resolution image according to the second exemplary embodiment.

DESCRIPTION OF THE EMBODIMENTS

Figure 1:
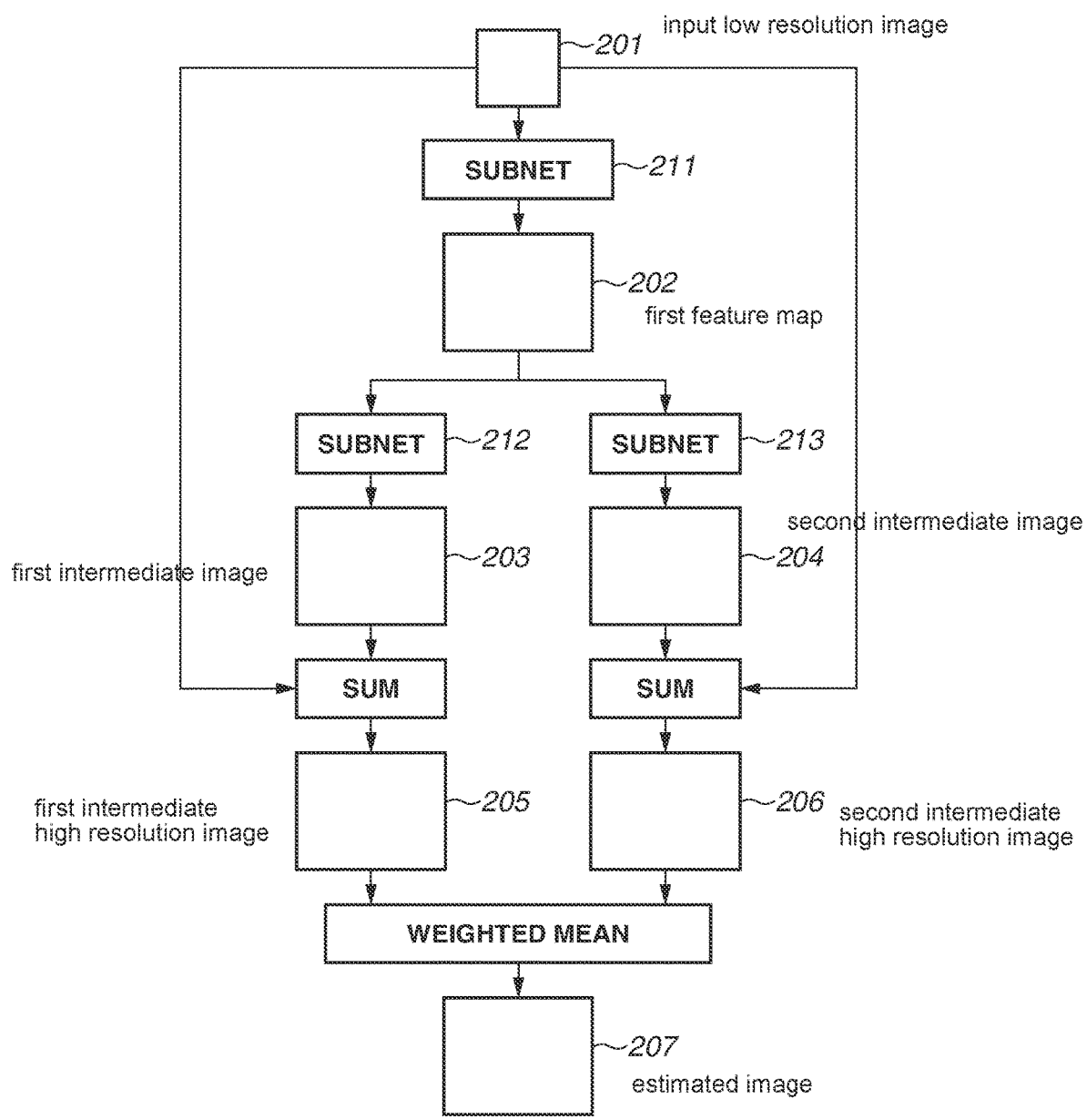
FIG. 1 is a diagram illustrating a procedure of resolution enhancement according to a first exemplary embodiment.

A system including a processing apparatus according to the present invention is described below with reference to the attached drawings. The same component is denoted with the same reference numeral in the drawings, and a redundant description thereof is omitted.

First, an outline of a first exemplary embodiment of the present invention is described before a detailed description. The first exemplary embodiment described below is one of desirable exemplary embodiments of the present invention, and not all components and features of the first exemplary embodiment are necessary for implementing the present invention.

In the present exemplary embodiment, a generator which is a machine learning model converts a low resolution image into a feature map (first feature map) and generates, from the first feature map, two intermediate images (a first intermediate image and a second intermediate image) having higher resolution than that of the low resolution image. In the following descriptions, the first intermediate image and the second intermediate image are also referred to as a first intermediate high resolution image and a second intermediate high resolution image, respectively.

The generator is trained by using different loss functions for the two intermediate high resolution images. The loss functions include a first loss based on a difference between the intermediate high resolution image and a high resolution image which is ground truth (a ground truth image), and a second loss which is defined based on a discrimination output from a discriminator which discriminates whether an input image is an image generated by the generator.

The first intermediate high resolution image is generated using a result of training using the loss function in which a weight of the second loss with respect to the first loss is smaller than that of the second intermediate high resolution image. For example, the learning for generating the first intermediate high resolution image uses only the first loss as the loss function.

The second intermediate high resolution image may be generated using a result of training using a weighted sum of the first loss and the second loss as the loss function. Accordingly, the second intermediate high resolution image is an image having a high resolution texture equivalent to that in the case of training using a super resolution generative adversarial network (SRGAN), although a false structure may appear.

On the other hand, a learning method for generating the first intermediate high resolution image is not a generative adversarial network (GAN) (or, contribution of GAN is weaker than that in generating the second intermediate high resolution image), so that the first intermediate high resolution image is an image in which both of the high resolution texture and the false structure are reduced. The two intermediate high resolution images are combined (by, for example, weighted mean), and thus a high resolution image (an estimated image) can be generated in which perceived resolution and appearance of the false structure are adjusted. The estimated image has higher resolution than that of the low resolution image. In the following descriptions, an estimated image is also referred to as an estimated high resolution image.

The method combines resolution enhanced images to be targets of the loss function instead of weights of the generator as in the case of the network interpolation, and thus can prevent image quality degradation, such as multiple edges or color change. Further, one generator simultaneously generates two intermediate high resolution images, so that an increase in a calculation time can also be suppressed.

In the following descriptions, a stage of determining weights of the generator and the discriminator which are machine learning models based on a learning data set is referred to as learning, and a stage of generating an estimated high resolution image from a low resolution image by the generator using the trained weight is referred to as estimating. The machine learning model includes, for example, a neural network, genetic programming, and a Bayesian network. The neural network includes a convolutional neural network (CNN), GAN, and a recurrent neural network (RNN).

Next, an image processing system according to the first exemplary embodiment is described.

Figure 2:
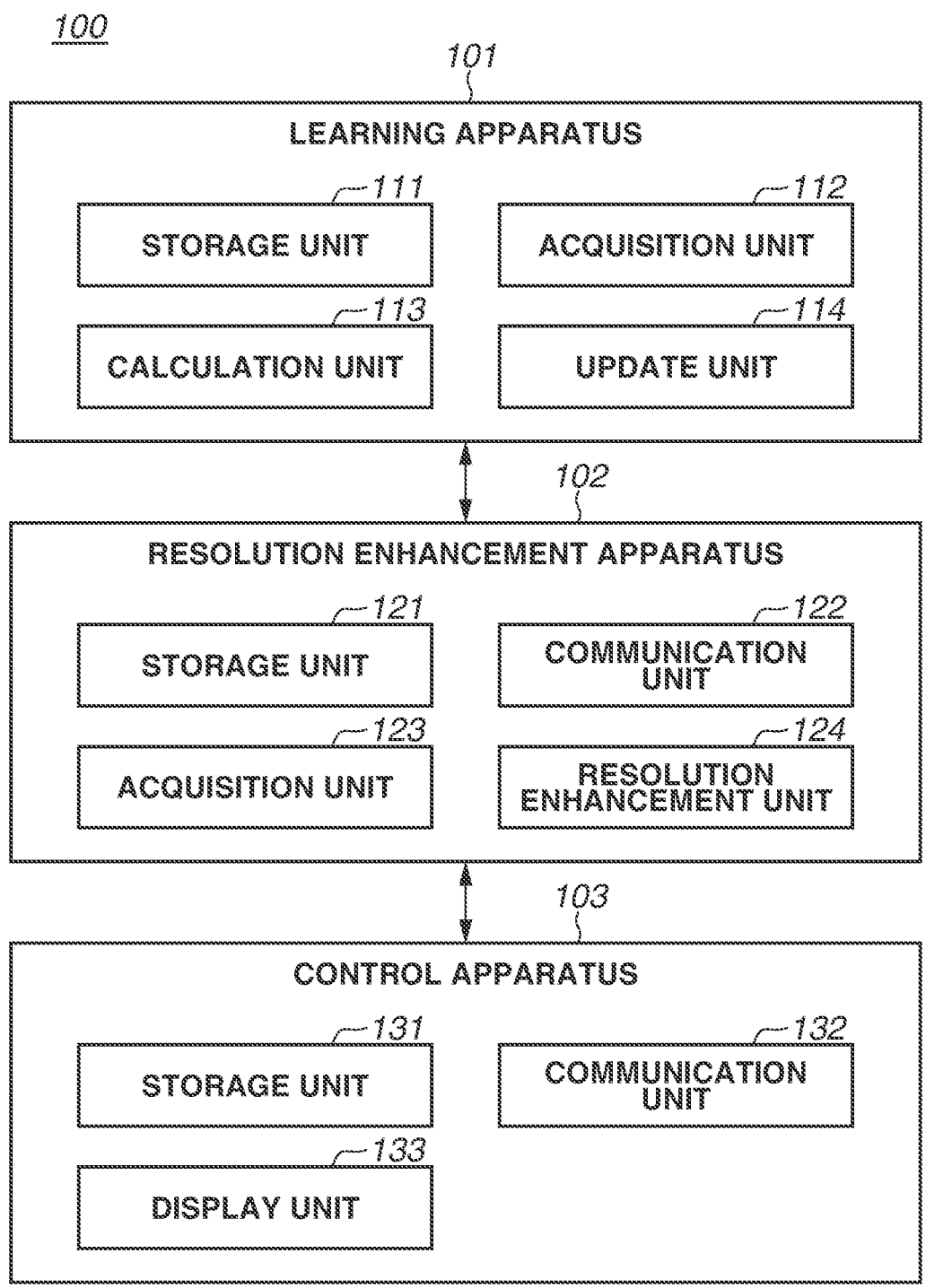
FIG. 2 is a block diagram illustrating an image processing system according to the first exemplary embodiment.
Figure 3:
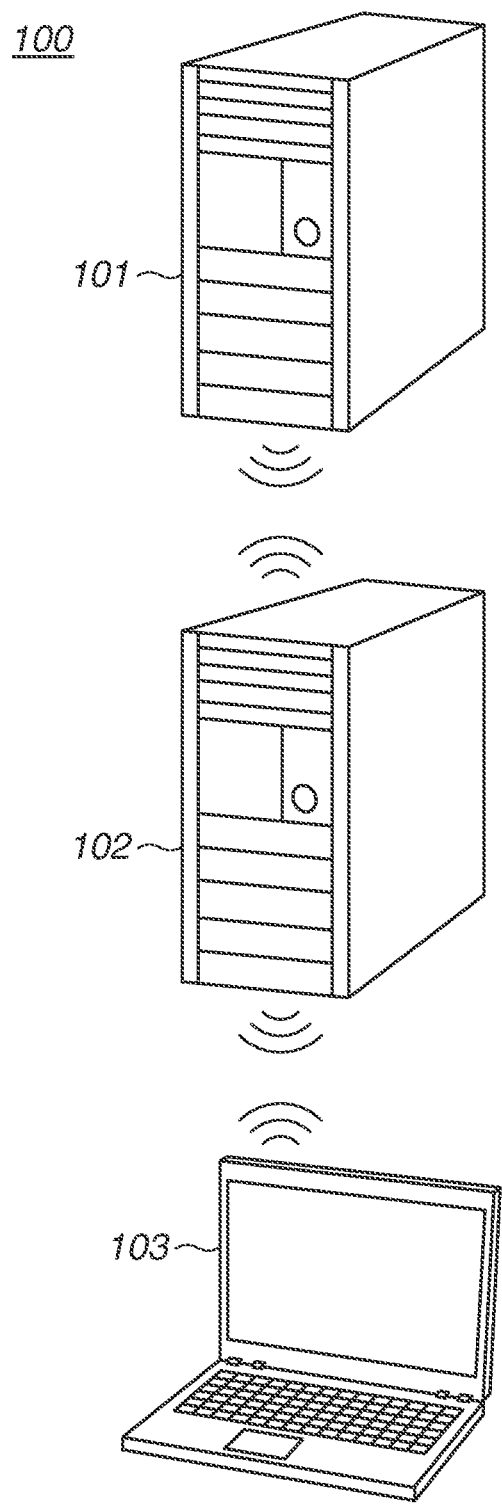
FIG. 3 is an external view illustrating the image processing system according to the first exemplary embodiment.

FIGS. 2 and 3 are a block diagram and an external view, respectively, of an image processing system 100.

The image processing system 100 includes a learning apparatus 101, a resolution enhancement apparatus 102, and a control apparatus 103 which are connected to each other by a wired or wireless network.

The control apparatus 103 includes a storage unit 131, a communication unit 132, and a display unit 133, and transmits a request to execute resolution enhancement on a low resolution image to the resolution enhancement apparatus 102 in response to a user's instruction.

The resolution enhancement apparatus 102 includes a storage unit 121, a communication unit 122, an acquisition unit 123, and a resolution enhancement unit 124, and executes resolution enhancement processing on a low resolution image using the generator which is the trained machine learning model, to generate an estimated high resolution image. Functions of the acquisition unit 123 and the resolution enhancement unit 124 can be implemented by one or more processors (processing units) such as a central processing unit (CPU). The resolution enhancement apparatus 102 acquires information about a weight of the generator from the learning apparatus 101 and stores the information in the storage unit 121.

The learning apparatus 101 includes a storage unit 111, an acquisition unit 112, a calculation unit 113, and an update unit 114, and learns the weight of the generator. Functions of the acquisition unit 112, the calculation unit 113, and the update unit 114 can be implemented by one or more processors (processing units) such as a CPU.

In the image processing system 100 configured as described above, the control apparatus 103 acquires the estimated high resolution image generated by the resolution enhancement apparatus 102, and presents a result to a user via the display unit 133.

Figure 4:
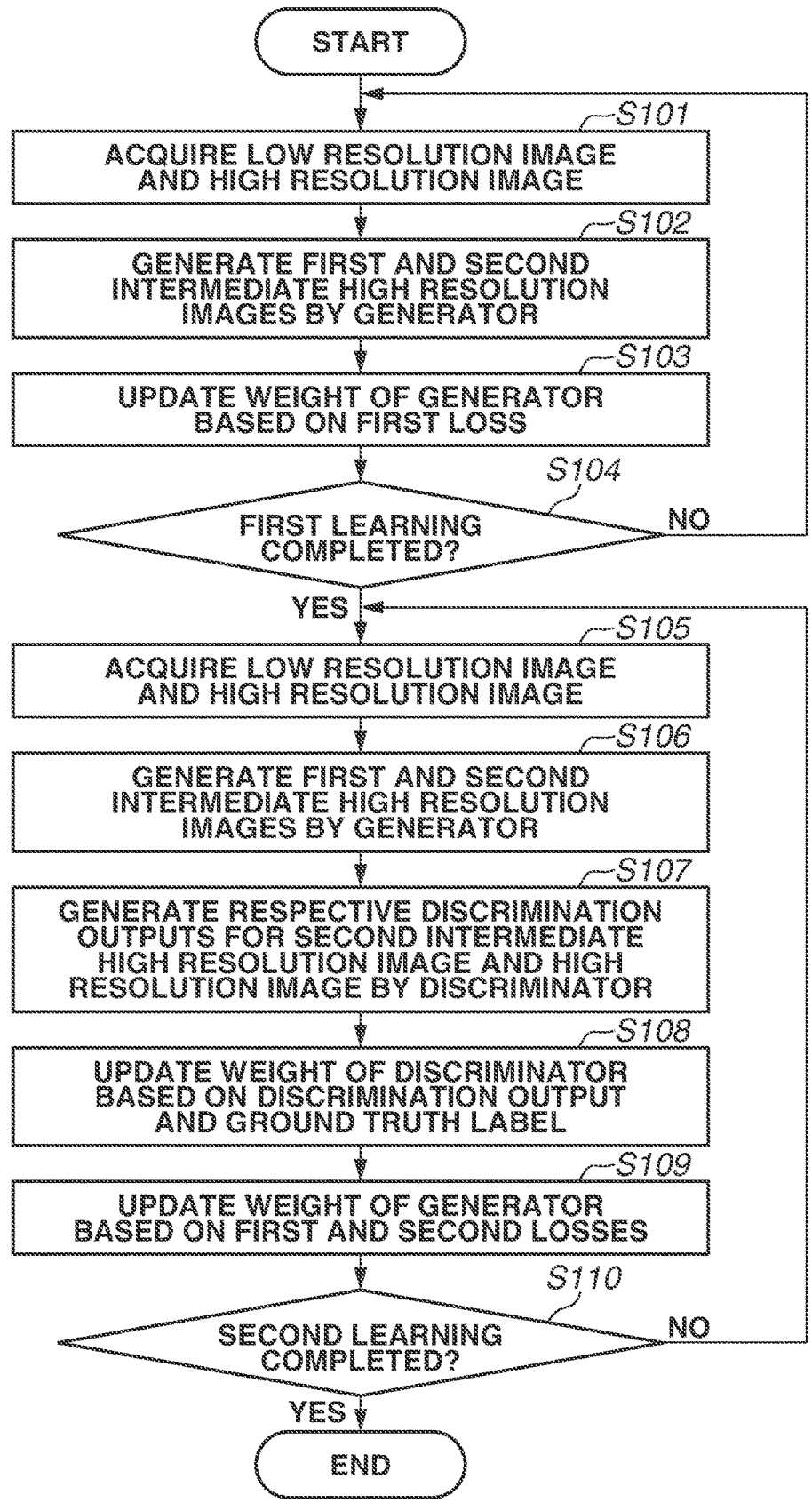
FIG. 4 is a flowchart illustrating learning by a machine learning model according to the first exemplary embodiment.

Next, learning of a weight executed by the learning apparatus 101 is described with reference to a flowchart in FIG. 4.

The learning according to the first exemplary embodiment includes two stages, namely first learning which does not use the discriminator and second learning (GAN) which uses the discriminator. The learning apparatus 101 includes the storage unit 111, the acquisition unit 112, the calculation unit 113, and the update unit 114, and each step in the flowchart is executed by any one of the units. Each function (method) of the flowchart described below can also be implemented as a program for causing a computer to execute the function (method).

In step S101, the acquisition unit 112 acquires one or more sets of a high resolution image and a low resolution image from the storage unit 111. The storage unit 111 stores a plurality of learning data sets each including a high resolution image and a low resolution image therein. The low resolution image and the high resolution image corresponding to each other include the same object therein. The low resolution image may be generated by downsampling the high resolution image. In the first exemplary embodiment, the number of pixels of the high resolution image is 16 times (4 times each in horizontal and vertical directions) that of the low resolution image. However, a relationship with regard to the number of pixels is not limited to this one. Further, an image may be either a color image or a gray scale image. Still further, degradation by a method other than downsampling (e.g., compression noise of Joint Photographic Experts Group (JPEG)) may be added to the low resolution image. Accordingly, the generator can be provided with a function of correcting image degradation in addition to a resolution enhancement function.

In step S102, the calculation unit 113 inputs the low resolution image to the generator to generate the first and second intermediate high resolution images. The generator is, for example, the CNN and uses a model having a configuration as illustrated in FIG. 1 according to the first exemplary embodiment. However, the present invention is not limited to the configuration.

An initial value of the weight of the generator may be generated using a random number or the like. In the generator illustrated in FIG. 1, an input low resolution image 201 is processed by a subnetwork (subnet) 211 and converted into a first feature map 202. The subnet 211 includes one or more linear sum layers. The linear sum layer has a function of calculating a linear sum of an input to the linear sum layer and a weight of the linear sum layer. Examples of the linear sum layer include a convolutional layer, a deconvolutional layer, and a fully connected layer.

The subnet 211 includes one or more activation functions for non-linear transformation. Examples of the activation function include a rectified linear unit (ReLU), a sigmoid function, and a hyperbolic tangent function.

In the first exemplary embodiment, the number of pixels of the low resolution image 201 is less than that of the corresponding high resolution image. Thus, in the first exemplary embodiment, the subnet 211 includes an upsampling layer for increasing the number of pixels in the horizontal and vertical directions. In other words, the upsampling layer is a layer having a function of executing upsampling on an input to the upsampling layer. The upsampling layer according to the first exemplary embodiment has a function of executing sub-pixel convolution (also referred to as pixel shuffler). The function of the upsampling layer is not limited to the above-described one, and the upsampling function may be implemented by deconvolution, bilinear interpolation, nearest neighbor interpolation, or the like. In a case where the sub-pixel convolution is used, a degree of freedom is increased due to reduction in an effect of zero padding and convolution of weight as compared with other methods, so that an effect of final resolution enhancement can be increased.

Figure 5A:
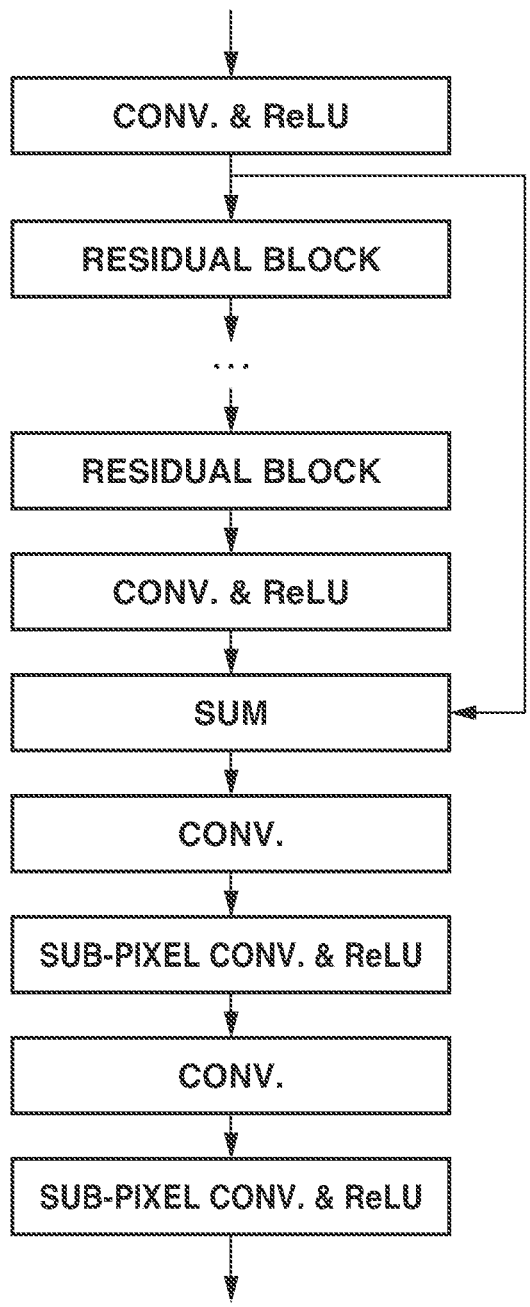
FIGS. 5A and 5B are schematic diagrams illustrating a subnet according to the first and second exemplary embodiments.

In the first exemplary embodiment, the subnet 211 has a configuration illustrated in FIG. 5A.

In FIG. 5A, "cony.", "sum", and "sub-pixel cony." represent convolution, summation of each pixel, and sub-pixel convolution, respectively.

Figure 5B:
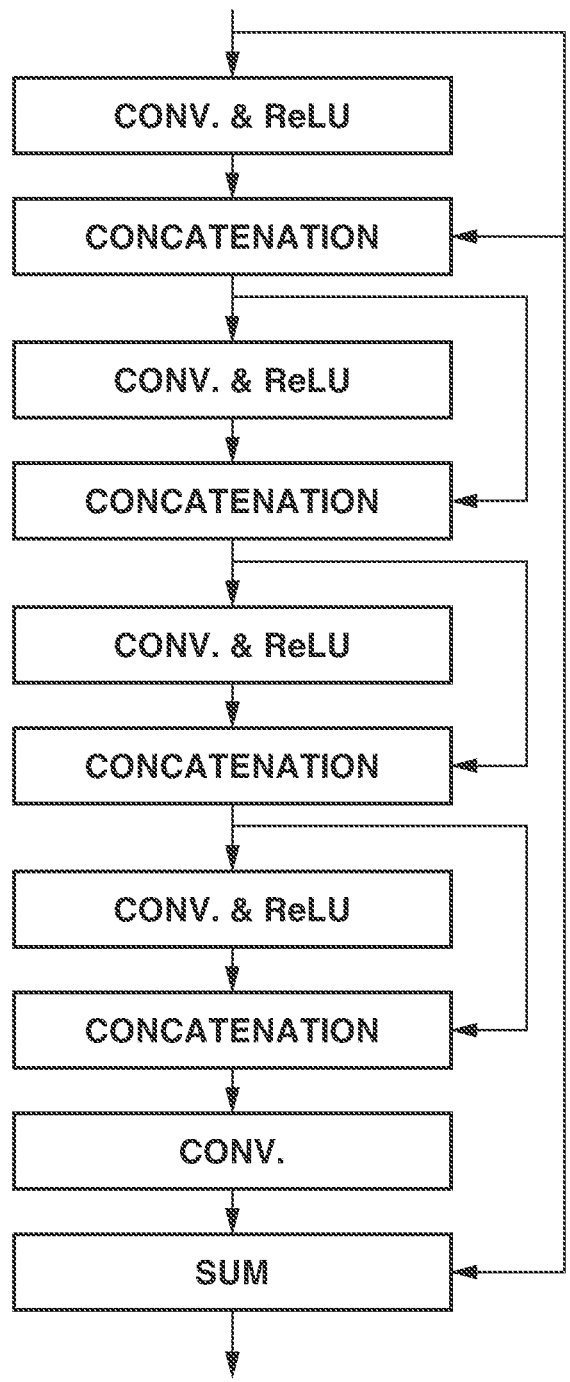

Further, "residual block" represents a residual block. A configuration of the residual block according to the first exemplary embodiment is illustrated in FIG. 5B.

The residual block is a block configured to include a plurality of linear sum layers and the activation function. The residual block has a configuration which calculates a sum of an input to the residual block and a result of a series of calculation processes in the residual block, and outputs the sum. Further, "concatenation" represents performing concatenation in a channel direction.

In the first exemplary embodiment, the subnet 211 includes eight residual blocks. However, the number of the residual blocks is not limited to eight. In a case where it is desirable to improve a performance of the generator, the number of the residual block can be increased.

In the first exemplary embodiment, there is a plurality of upsampling layers (sub-pixel convolution). In the first exemplary embodiment, the sub-pixel convolution which upsamples the number of pixels four times is executed twice to upsample the number of pixels of the low resolution image 16 times. If one upsampling layer performs upsampling at a high rate, a grid pattern or the like tend to be generated in an image subjected to the resolution enhancement, so that it is desirable to execute upsampling at a low rate for a plurality of times. In the first exemplary embodiment, the example in which the upsampling layer is included in the subnet 211 has been described. However, the present invention is not limited to this example. The upsampling layer may be included in a subnet 212 or a subnet 213 instead of the subnet 211.

The first feature map 202 is input to the subnet 212, and a first residual component 203 is generated. Further, the first feature map 202 is input to the subnet 213, and a second residual component 204 is generated.

The subnet 212 and the subnet 213 each include one or more linear sum layers. Each of the subnet 212 and the subnet 213 is constituted of one convolutional layer in the first exemplary embodiment. Alternatively, the subnet 212 and the subnet 213 may be integrated into one linear sum layer. For example, if the number of filters in the convolutional layer is doubled, an output having twice as many channels as the number of channels of the low resolution image 201 (three in the case of color) can be obtained. By dividing the output into two in the channel direction, the first residual component 203 and the second residual component 204 can be obtained.

The first residual component 203 is summed with the low resolution image 201, and a first intermediate high resolution image 205 is generated. The second residual component 204 is summed with the low resolution image 201, and a second intermediate high resolution image 206 is generated. The low resolution image 201 is upsampled before being summed so that the number of pixels of the low resolution image 201 matches the number of pixels of the first residual component 203 and the second residual component 204. The upsampling may be performed by bilinear interpolation or bicubic interpolation, or by using a deconvolutional layer. Estimation is performed not for the high resolution image but for the residual component of the high resolution image, and thus image quality degradation such as a color change from the low resolution image 201 is less likely to occur.

The low resolution image 201 may be upsampled in advance by bicubic interpolation or the like so that the number of pixels thereof matches the number of pixels of the high resolution image, and then the low resolution image 201 may be input to the generator. In this case, the generator does not need to include the upsampling layer. However, as the number of pixels of the low resolution image 201 in the horizontal and vertical directions increases, the number of calculations of the linear sum increases, and thus a calculation load increases. Thus, it is desirable that the low resolution image 201 be input to the generator without being upsampled and be upsampled in the generator as in the first exemplary embodiment.

In step S103, the update unit 114 updates the weight of the generator based on the first loss. The first loss according to the first exemplary embodiment is a loss defined based on a difference between the high resolution image (ground truth image) corresponding to the low resolution image 201 and the intermediate high resolution image. In the first exemplary embodiment, mean squared error (MSE) is used, but mean absolute error (MAE) or the like may be used.

In the first exemplary embodiment, a sum of the MSE of the first intermediate high resolution image 205 and the high resolution image and the MSE of the second intermediate high resolution image 206 and the high resolution image is used as the loss function, and the weight of the generator is updated by backpropagation.

In step S104, the update unit 114 determines whether the first learning is completed. Completion can be determined by whether the number of repetitions of learning (updates of the weight) has reached a predetermined number or whether an amount of change in the weight at the time of update is smaller than a predetermined value. In a case where it is determined that the first learning is not yet completed (NO in step S104), the processing returns to step S101, and the acquisition unit 112 acquires one or more sets of new low resolution image 201 and high resolution image. On the other hand, in a case where it is determined that the first learning is completed (YES in step S104), the processing proceeds to step S105, and the second learning is started.

In step S105, the acquisition unit 112 acquires one or more sets of high resolution image and low resolution image 201 from the storage unit 111.

In step S106, the calculation unit 113 inputs the low resolution image 201 to the generator to generate the first intermediate high resolution image 205 and the second intermediate high resolution image 206.

In step S107, the calculation unit 113 inputs the second intermediate high resolution image 206 and the high resolution image individually to the discriminator to generate respective discrimination outputs. The discriminator discriminates whether the input image is the high resolution image generated by the generator or an actual high resolution image. The CNN or the like can be used as the discriminator. An initial value of the weight of the discriminator is determined using a random number or the like. The high resolution image to be input to the discriminator may be any actual high resolution image and does not have to be an image corresponding to the low resolution image 201.

In step S108, the update unit 114 updates the weight of the discriminator based on the discrimination output and a ground truth label. In the first exemplary embodiment, the ground truth label with respect to the second intermediate high resolution image 206 is 0, and the ground truth label with respect to the actual high resolution image is 1. Sigmoid cross entropy is used as the loss function, but another function may be used.

In step S109, the update unit 114 updates the weight of the generator based on the first loss and the second loss. Only the first loss (the MSE with the corresponding high resolution image) is calculated with respect to the first intermediate high resolution image 205. A weighted sum of the first loss and the second loss is calculated with respect to the second intermediate high resolution image 206. The second loss is the sigmoid cross entropy between the discrimination output obtained by inputting the second intermediate high resolution image 206 to the discriminator and the ground truth label, which is 1. Since the generator intends to learn so that the discriminator erroneously determines the second intermediate high resolution image 206 as the actual high resolution image, the ground truth label is set to 1 (corresponding to the actual high resolution image). A sum of the losses of the first intermediate high resolution image 205 and the second intermediate high resolution image 206 is regarded as the loss function of the generator.

The update of the weight is repeated using the loss function, and thus a high resolution image having a high resolution texture and a natural appearance which causes the discriminator to make erroneous determination is generated on a second intermediate high resolution image 206 side. However, a false structure may appear as an adverse effect. Meanwhile, on a first intermediate high resolution image 205 side, both the high resolution texture and the false structure are prevented, and a high resolution image is output which includes fewer high frequency components than that in the second intermediate high resolution image 206.

In the first exemplary embodiment, only the first loss is used with respect to the first intermediate high resolution image 205, but the second loss may be used together. In this case, a weight of the second loss with respect to the first loss in the first intermediate high resolution image 205 may be set smaller than that in the second intermediate high resolution image 206. An order of steps S108 and S109 may be reversed.

In step S110, the update unit 114 determines whether the second learning is completed. In a case where it is determined that the second learning is not yet completed (NO in step S110), the processing returns to step S105, and the acquisition unit 112 acquires one or more sets of new low resolution image 201 and high resolution image. In a case where it is determined that the second learning is completed (YES in step S110), information about the weight is stored in the storage unit 111. Since only the generator is used at the time of estimation, only the weight of the generator may be stored.

Figure 6:
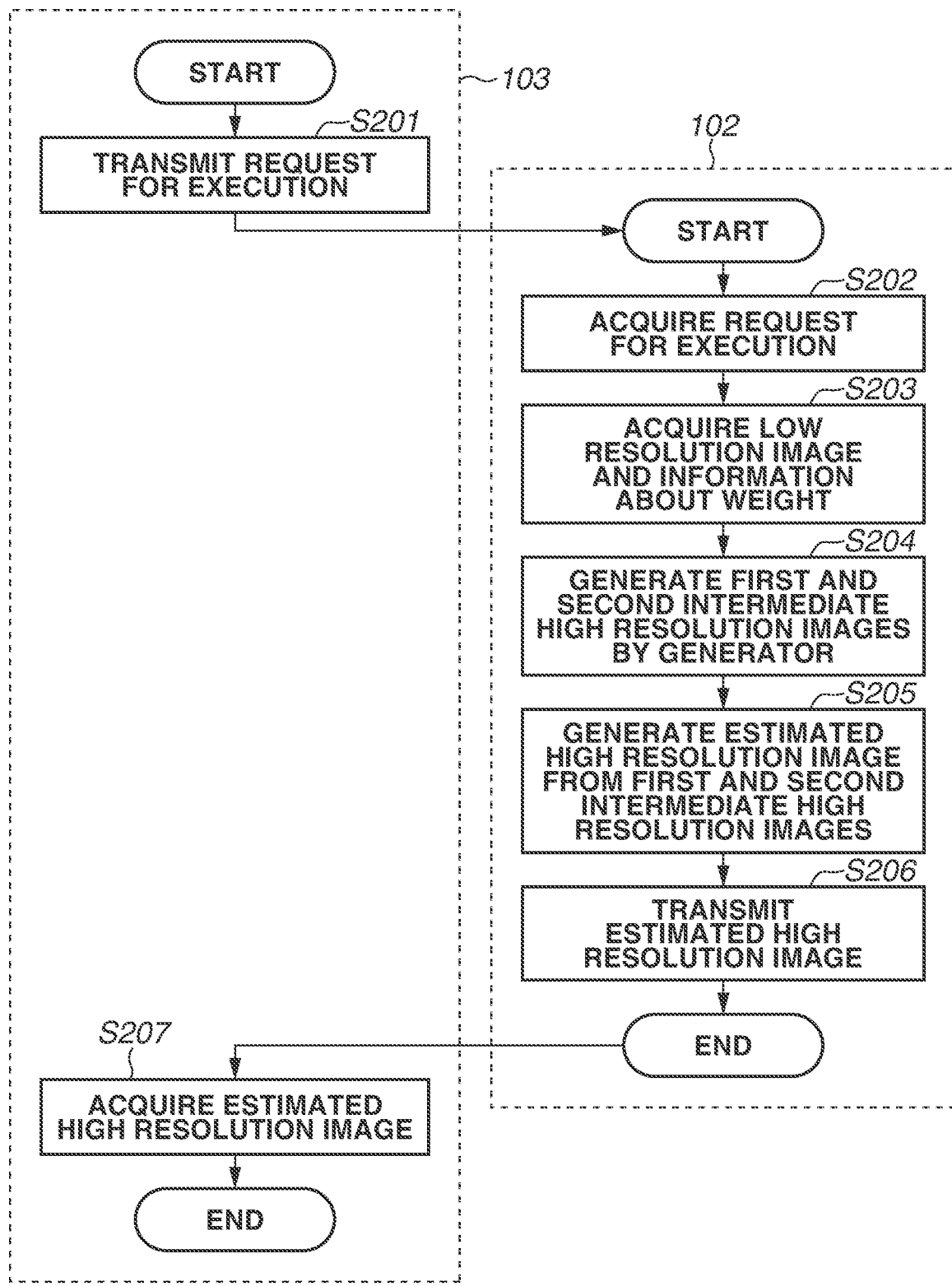
FIG. 6 is a flowchart illustrating generation of an estimated high resolution image according to the first exemplary embodiment.

Next, estimation (generation of an estimated high resolution image) executed in the resolution enhancement apparatus 102 and the control apparatus 103 is described with reference to the flowchart in FIG. 6. The resolution enhancement apparatus 102 includes the storage unit 121, the communication unit 122, the acquisition unit 123, and the resolution enhancement unit 124. The control apparatus 103 includes the storage unit 131, the communication unit 132, and the display unit 133. Each step in the flowchart is executed by any one of the units.

In step S201, the communication unit 132 of the control apparatus 103 transmits a request to execute resolution enhancement to the resolution enhancement apparatus 102. The request for execution also includes information specifying the low resolution image 201 subjected to the resolution enhancement. Alternatively, the low resolution image 201 to be subjected to the resolution enhancement may be transmitted together with the request for execution of the resolution enhancement.

In step S202, the communication unit 122 of the resolution enhancement apparatus 102 acquires the request for execution transmitted from the control apparatus 103.

In step S203, the acquisition unit 123 acquires the information about the weight of the generator and the low resolution image 201 to be subjected to resolution enhancement from the storage unit 121. The low resolution image 201 may be acquired from another storage device connected in a wired or wireless manner In step S204, the resolution enhancement unit 124 generates the first intermediate high resolution image 205 and the second intermediate high resolution image 206 from the low resolution image 201 using the generator illustrated in FIG. 1. The second intermediate high resolution image 206 is the high resolution image having the high resolution texture and the natural appearance, but the false structure may appear therein. On the other hand, the first intermediate high resolution image 205 is the high resolution image in which the high resolution texture and the false structure are both prevented. The first intermediate high resolution image 205 includes fewer high frequency components than the second intermediate high resolution image 206.

In step S205, the resolution enhancement unit 124 generates an estimated high resolution image 207 based on the first intermediate high resolution image 205 and the second intermediate high resolution image 206. In the first exemplary embodiment, the estimated high resolution image 207 is generated by calculating the weighted mean of the first intermediate high resolution image 205 and the second intermediate high resolution image 206. Alternatively, generation of the estimated high resolution image 207 is not limited to the weighted mean of the first intermediate high resolution image 205 and the second intermediate high resolution image 206. The estimated high resolution image 207 may be generated by replacing a partial region in the second intermediate high resolution image 206 with the first intermediate high resolution image 205.

In step S206, the communication unit 122 transmits the estimated high resolution image 207 to the control apparatus 103.

In step S207, the communication unit 132 of the control apparatus 103 acquires the estimated high resolution image 207. The acquired estimated high resolution image 207 is stored in the storage unit 131 or is displayed on the display unit 133. Alternatively, the estimated high resolution image 207 may be stored in another storage device connected in a wired or wireless manner from the control apparatus 103 or the resolution enhancement apparatus 102. Further, the control apparatus 103 may be configured to acquire the first intermediate high resolution image 205 and the second intermediate high resolution image 206 and generate the estimated high resolution image 207. In this case, a user can adjust the perceived resolution and the appearance of the false structure while checking an actual image on the display unit 133.

Next, a condition desirable for acquiring an effect of the present invention is described.

It is desirable that the number of the linear sum layers be less on an output side than on an input side of the upsampling layer which is the closest to the output side. This is because if upsampling is performed early in the calculation of the generator, the number of subsequent calculations of the linear sum increases, and thus the calculation load increases. In the first exemplary embodiment, 40 or more linear sum layers exist on the input side of the upsampling layer which is the closest to the output side, but, on the output side, only one linear sum layer exists with respect to each of the first residual component 203 and the second residual component 204.

The generator is configured to include a plurality of linear sum layers, and it is desirable that an output of at least one of the plurality of linear sum layers be concatenated to an input of the linear sum layer in the channel direction. This refers to, for example, the concatenation indicated by "concatenation" in FIG. 5B. Accordingly, the generator can transmit more feature maps to the subsequent layers, and accuracy of the first intermediate high resolution image 205 and the second intermediate high resolution image 206 can be improved.

Further, it is desirable that at least half of the plurality of linear sum layers included in the generator be concatenated to the input of the linear sum layer in the channel direction. Accordingly, accuracy of the resolution enhancement can be further improved.

In addition, it is desirable that each of a plurality of residual blocks included in the generator include three or more linear sum layers. Accordingly, the accuracy of the resolution enhancement can be improved. It is further desirable that the residual block include two or more activation functions. Accordingly, a non-linear effect increases, and the accuracy of the resolution enhancement can be improved.

Further, it is desirable that half or less of the plurality of residual blocks included in the generator include a batch regularization layer for performing batch regularization. Unlike in a recognition task, an effect of improving the accuracy by batch regularization is small in a regression task for estimating an image from an image. Thus, it is desirable to reduce the number of batch regularization layers in order to reduce the calculation load. In a case where it is desired to further reduce the calculation load, the generator may be configured to include no batch regularization layer.

A trained feature extractor which converts an image into a feature map can be used in the learning by the generator. The feature extractor converts the high resolution image which is the ground truth image corresponding to the low resolution image 201 into a second feature map and converts the second intermediate high resolution image 206 into a third feature map. The generator may learn by adding a third loss based on a difference between the second feature map and the third feature map (for example, the MSE) to the loss function. Accordingly, an abstract feature is added by the loss function, and thus a resolution enhanced image will look natural.

It is desirable that the second loss be based on a comparison of a value based on each of the discrimination outputs from the discriminator corresponding to a plurality of actual high resolution images and a value of the discrimination output of the first intermediate high resolution image 205 or the second intermediate high resolution image 206. This method is referred to as a relativistic GAN. A mean value or a median value of a plurality of discrimination outputs can be used as the value based on each of the discrimination outputs from the discriminator corresponding to the plurality of actual high resolution images. For example, the sigmoid cross entropy is calculated so that a difference between the discrimination output of the first intermediate high resolution image 205 or the second intermediate high resolution image 206 and the mean value of the discrimination outputs of the actual high resolution images indicates the ground truth label (which is 1). Accordingly, the learning can be performed from a relative viewpoint of whether the high resolution image generated by the generator is more real with respect to a set of actual high resolution images. The conventional GAN sometimes has a problem of ignoring the actual high resolution image in the learning and trying to learn what is real only from the high resolution image generated by the generator. However, the relativistic GAN can avoid the problem and improve stability of the learning.

In the above-described configuration, the image processing system can be provided which can control the perceived resolution and the appearance of the false structure while suppressing an increase of the calculation load and preventing image quality degradation in the resolution enhancement of an image using the machine learning model. In other words, a high quality image can be provided in the resolution enhancement of an image using the machine learning model.

An image processing system according to a second exemplary embodiment of the present invention is described.

Figure 7:
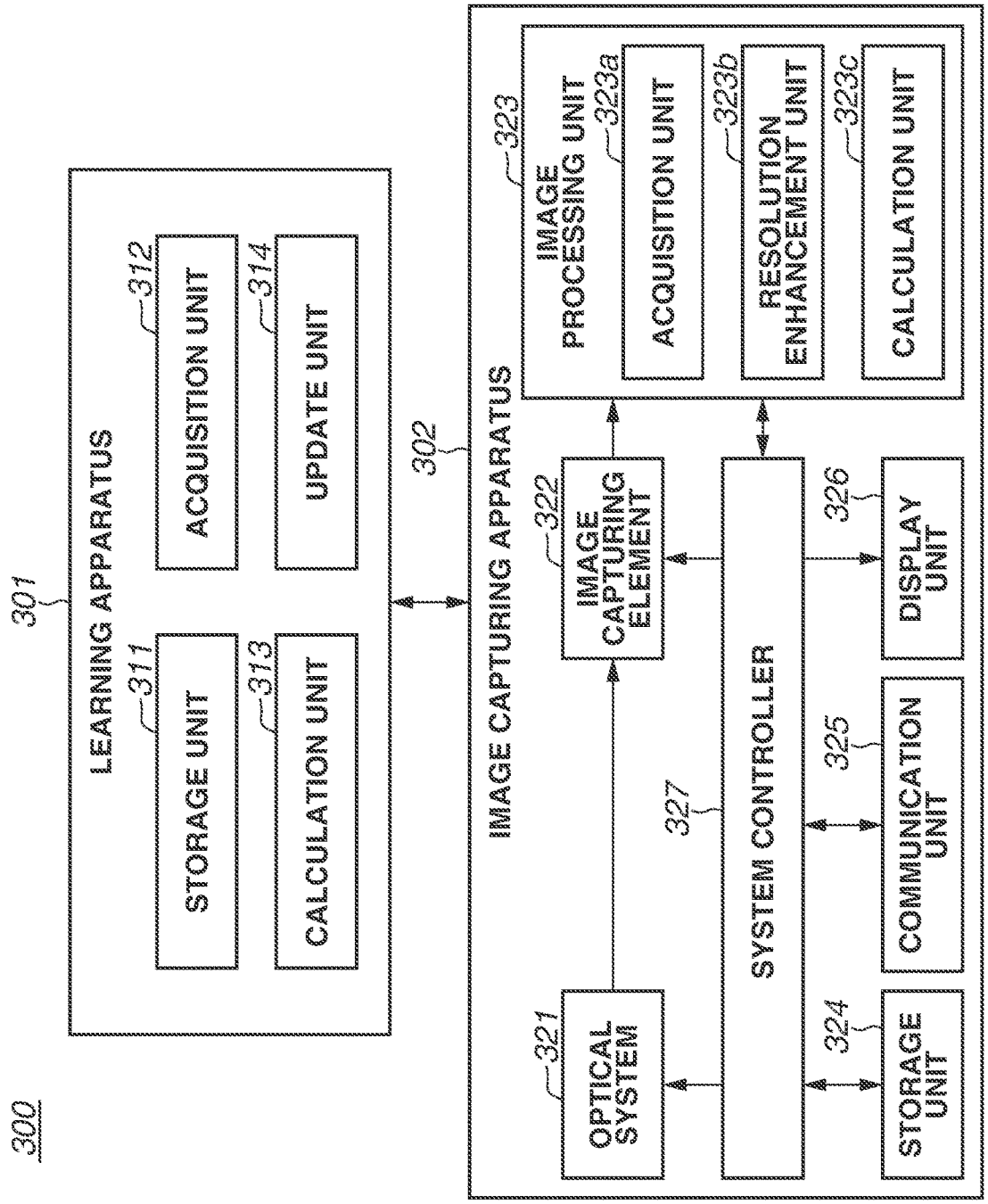
FIG. 7 is a block diagram illustrating an image processing system according to the second exemplary embodiment.
Figure 8:
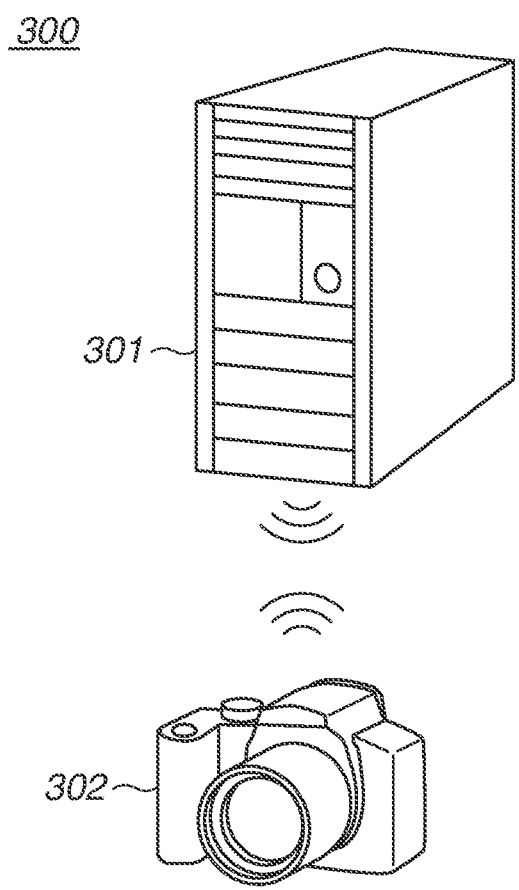
FIG. 8 is an external view illustrating the image processing system according to the second exemplary embodiment.

FIGS. 7 and 8 are a block diagram and an external view, respectively, of an image processing system 300. The image processing system 300 includes a learning apparatus 301 and an image capturing apparatus 302. The image capturing apparatus 302 includes an optical system 321, an image capturing element 322, an image processing unit 323, a storage unit 324, a communication unit 325, a display unit 326, and a system controller 327. The optical system 321 collects light incident from an object space and forms an object image. The optical system 321 has functions of performing zooming, diaphragm adjustment, and auto focusing as needed. The image capturing element 322 converts the object image into an electrical signal by photoelectric conversion and generates a captured image. The image capturing element 322 is, for example, a charge coupled device (CCD) sensor or a complementary metaloxide semiconductor (CMOS) sensor. The captured image is acquired as a live view of the object space before image capturing and in a case where a user presses a release button, subjected to predetermined processing in the image processing unit 323, and displayed on the display unit 326.

In a case where the user inputs an instruction for digital zoom and presses the release button at the time of image capturing, the captured image (a low resolution image) is subjected to the resolution enhancement by a generator which is a machine learning model in the image processing unit 323. At that time, a weight learned by the learning apparatus 301 is used. Information about the weight is read in advance from the learning apparatus 301 via the communication unit 325 and stored in the storage unit 324. Learning and estimation by the generator are described in detail below.

In the live view in a case where the user inputs the instruction for digital zoom, an image upsampled by a high-speed method such as bilinear interpolation is displayed on the display unit 326. The captured image subjected to the resolution enhancement by the generator (an estimated high resolution image) is stored in the storage unit 324 and displayed on the display unit 326. The above-described operations are controlled by the system controller 327.

In FIG. 8, the image capturing apparatus 302 is illustrated as a single-lens reflex camera, but may be a device such as a smartphone.

Figure 9:
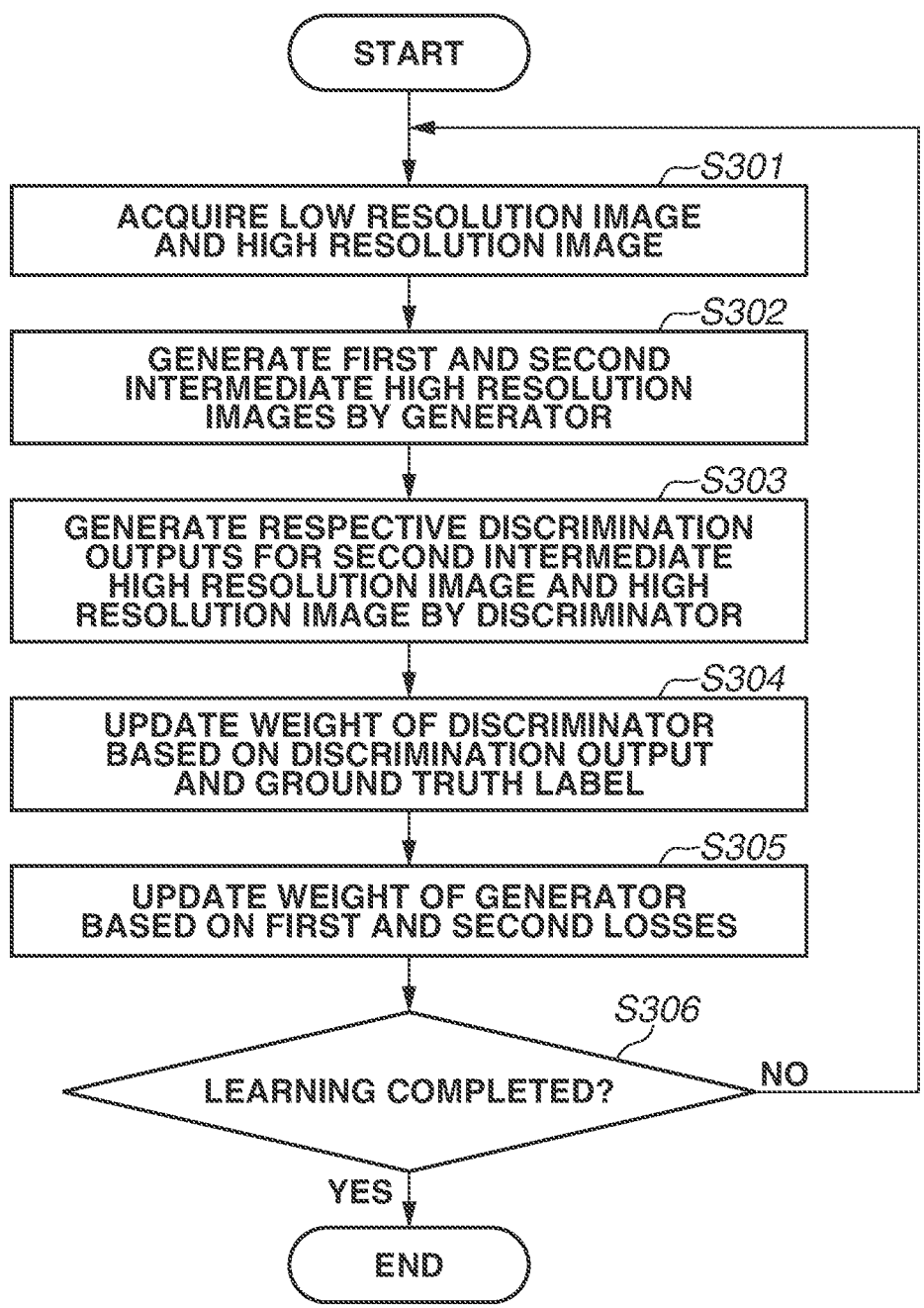
FIG. 9 is a flowchart illustrating learning by a machine learning model according to the second exemplary embodiment.

Next, learning of the weight of the generator executed by the learning apparatus 301 is described with reference to a flowchart in FIG. 9. The learning apparatus 301 includes a storage unit 311, an acquisition unit 312, a calculation unit 313, and an update unit 314, and each step in the flowchart is executed by any one of the units.

In step S301, the acquisition unit 312 acquires one or more sets of a low resolution image and a high resolution image from the storage unit 311. In the second exemplary embodiment, the number of pixels of the high resolution image is 16 times that of the low resolution image, but is not limited to this value.

Figure 10:
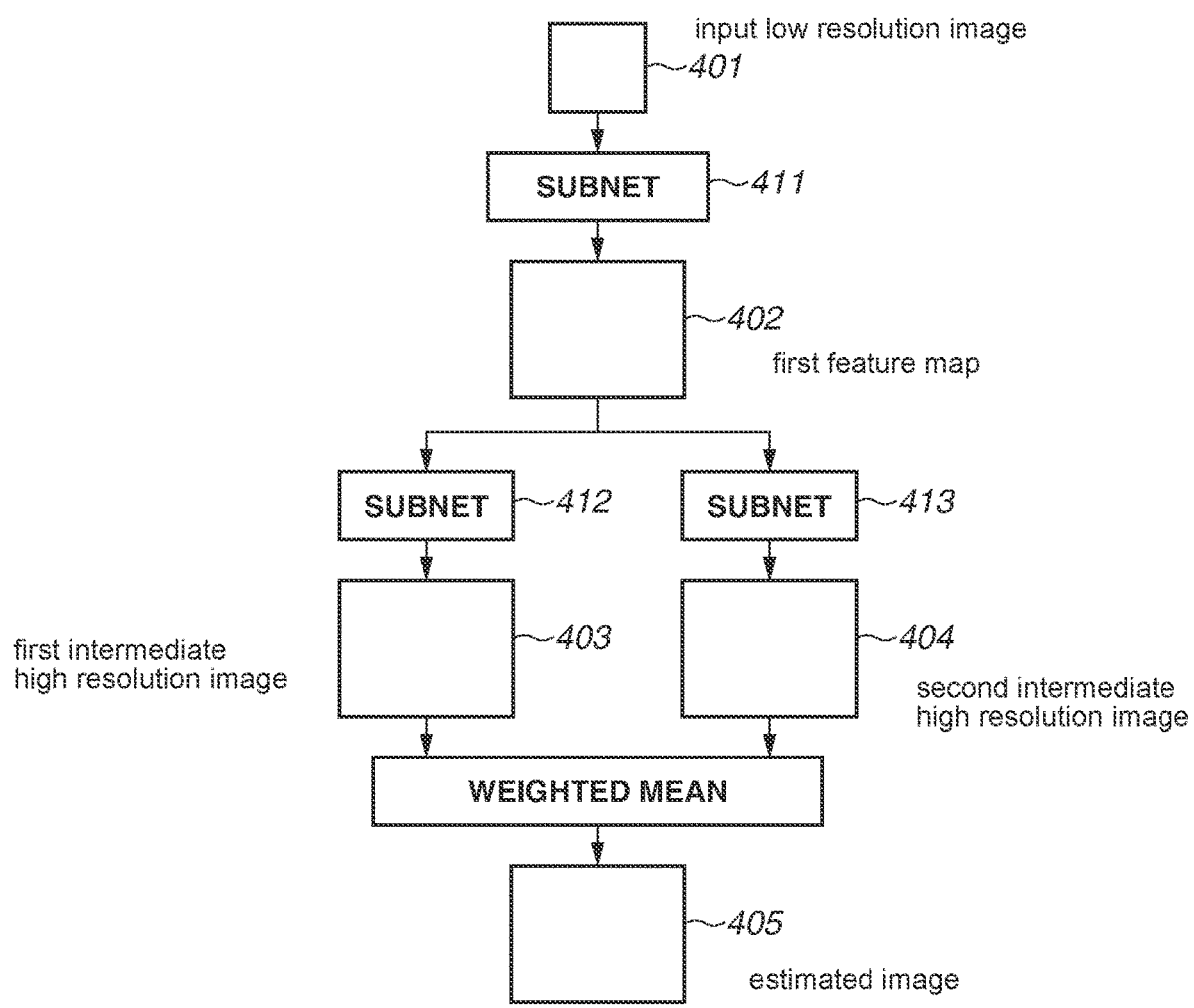
FIG. 10 is a diagram illustrating a procedure of resolution enhancement according to the second exemplary embodiment.
Figure 11:
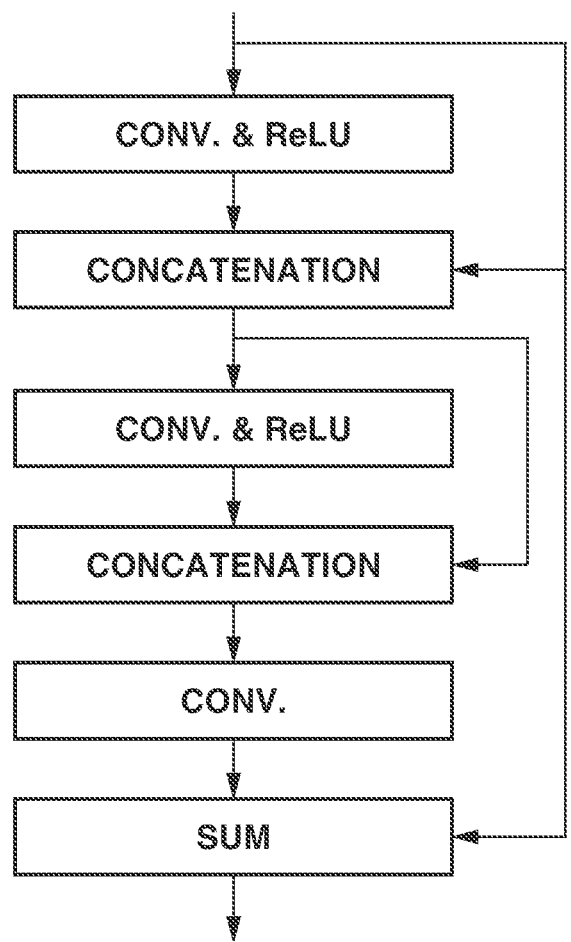
FIG. 11 is a schematic diagram illustrating a subnet according to the second exemplary embodiment.

In step S302, the calculation unit 313 inputs the low resolution image to the generator to generate a first intermediate high resolution image and a second intermediate high resolution image. In the second exemplary embodiment, the generator has a configuration illustrated in FIG. 10. A subnet 411 converts a low resolution image 401 into a first feature map 402, and a subnet 412 and a subnet 413 generate a first intermediate high resolution image 403 and a second intermediate high resolution image 404, respectively, from the first feature map 402. The subnet 411 has a configuration illustrated in FIG. 5A, and a residual block has a configuration illustrated in FIG. 11. The subnet 411 includes four residual blocks. Each of the subnet 412 and the subnet 413 is configured to include one convolutional layer. However, the configuration of each subnet is not limited to the above-described one.

In step S303, the calculation unit 313 inputs the high resolution image and the second intermediate high resolution image 404 individually to the discriminator to generate respective discrimination outputs.

In step S304, the update unit 314 updates the weight of the discriminator based on the discrimination output and a ground truth label.

In step S305, the update unit 314 updates the weight of the generator based on a first loss and a second loss. The first loss and the second loss are the same as those described in the first exemplary embodiment.

In step S306, the update unit 314 determines whether the learning of the generator is completed. In a case where it is determined that the learning of the weight is not yet completed (NO in step S306), the processing returns to step S301. In a case where it is determined that the learning of the weight is completed (YES in step S306), the learning ends, and information about the weight is stored in the storage unit 311.

Next, resolution enhancement of a digitally zoomed captured image executed by the image processing unit 323 is described with reference to the flowchart in FIG. 12. The image processing unit 323 includes an acquisition unit 323a, a resolution enhancement unit 323b, and a calculation unit 323c, and each step in the flowchart is executed by any one of the units.

In step S401, the acquisition unit 323a extracts a partial area (the low resolution image 401) from the captured image. Since the captured image includes information about all pixels acquired by the image capturing element 322, only the partial area necessary for digital zoom is extracted.

In step S402, the acquisition unit 323a acquires the information about the weight of the generator from the storage unit 324. An order of steps S401 and S402 does not matter.

In step S403, the resolution enhancement unit 323b inputs the partial area (the low resolution image 401) of the captured image to the generator to generate the first intermediate high resolution image 403 and the second intermediate high resolution image 404.

In step S404, the calculation unit 323c generates an estimated high resolution image 405 by calculating a weighted mean of the first intermediate high resolution image 403 and the second intermediate high resolution image 404.

In step S405, the calculation unit 323c scales (upsamples or downsamples) the estimated high resolution image 405 to the specified number of pixels. The generator is trained to upsample the number of pixels by 16 times, and thus it is necessary to match the number of pixels with a magnification of the digital zoom specified by the user. Bicubic interpolation or the like is used for downsampling, and anti-aliasing processing may be performed as necessary. In a case where the digital zoom with a magnification of four or more times is specified in one dimension, the estimated high resolution image 405 is upsampled by bicubic interpolation or the like. Alternatively, the estimated high resolution image 405 may be input to the generator as a new low resolution image 401.

In the above-described configuration, the image processing system can be provided which can control the perceived resolution and the appearance of the false structure while suppressing an increase of the calculation load and preventing image quality degradation in the resolution enhancement of an image using the machine learning model. In other words, a high quality image can be provided in the resolution enhancement of an image using the machine learning model.

In each of the above-described exemplary embodiments, the example has been described in which the MSE or MAE is used as the first loss, and the discrimination result by the discriminator is used as the second loss. However, the present invention is not limited to the example. The effect of the present invention can be obtained by generating the first intermediate image and the second intermediate image which have characteristics different from each other from the first feature map based on the low resolution image and generating the estimated image based on the first intermediate image and the second intermediate image. This is because an adverse effect which occurs in one of the first intermediate image and the second intermediate image can be compensated by the other.

The present invention can also be implemented by executing the following processing. More specifically, a program for implementing one or more functions of the above-described exemplary embodiments is supplied to a system or an apparatus via a network or a storage medium, and one or more processors in a computer of the system or the apparatus reads and executes the program. Further, the present invention can also be implemented by a circuit (for example, an application specific integrated circuit (ASIC)) for implementing one or more functions.

In each of the above-described exemplary embodiments, an image processing apparatus, an image processing method, a learning method, a learning apparatus, and a storage medium storing a program which can generate a high quality image based on resolution enhancement of an image using a machine learning model can be provided.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-152151, filed Sep. 10, 2020, which is hereby incorporated by reference herein in its entirety.

What is claimed is:

1. A method for processing an image, the method comprising:

converting an input low resolution image into a first feature map and generating a first intermediate image and a second intermediate image from the first feature map, the first intermediate image and the second intermediate image each having resolution higher than resolution of the low resolution image, by using a generator which is a machine learning model; and generating an estimated image having higher resolution than the resolution of the low resolution image based on the first intermediate image and the second intermediate image, wherein the generator includes an upsampling layer and one or more linear sum layers, wherein the upsampling layer upsamples an input to the upsampling layer, wherein each of the linear sum layers outputs a linear sum of an input to the linear sum layer and weights of the linear sum layer, and wherein a number of the linear sum layers is less on an output side of a first upsampling layer which is closest to the output side of the generator among upsampling layers included in the generator than on an input side of the first upsampling layer.

2. The method according to claim 1, wherein the first intermediate image includes fewer high frequency components than the second intermediate image.

3. The method according to claim 1, wherein the first intermediate image and the second intermediate image each include more pixels than the low resolution image.

4. The method according to claim 1, wherein the generator generates the first intermediate image by summing a first residual component generated from the first feature map and the low resolution image, and wherein the generator generates the second intermediate image by summing a second residual component generated from the first feature map and the low resolution image.

5. The method according to claim 4, wherein the low resolution image is upsampled before being summed with the first residual component and the second residual component so that a number of pixels of the low resolution image matches a number of pixels of each of the first residual component and the second residual component.

6. The method according to claim 1, wherein the generator includes a plurality of linear sum layers, wherein each of the linear sum layers outputs a linear sum of an input to the linear sum layer and weights of the linear sum layer, and wherein an output of at least one of the plurality of linear sum layers is concatenated to an input of the linear sum layer in a channel direction.

7. The method according to claim 1, wherein the generator includes a plurality of linear sum layers, wherein each of the linear sum layers outputs a linear sum of an input to the linear sum layer and weights of the linear sum layer, and wherein outputs of at least half of the plurality of linear sum layers are concatenated to inputs of the respective linear sum layers in a channel direction.

8. The method according to claim 1, wherein the generator includes a plurality of residual blocks each including a plurality of linear sum layers, wherein each of the linear sum layers outputs a linear sum of an input to the linear sum layer and weights of the linear sum layer, and wherein each of the residual blocks outputs a sum of an input to the residual block and a result of calculation on the input by the residual block.

9. The method according to claim 8, wherein the residual block includes two or more activation functions which perform non-linear transformation.

10. The method according to claim 1,
wherein the generator includes a plurality of residual blocks each including a plurality of linear sum layers,
wherein each of the linear sum layers outputs a linear sum of an input to the linear sum layer and weights of the linear sum layer,
wherein each of the residual blocks outputs a sum of an input to the residual block and a result of calculation on the input by the residual block, and
wherein half or less of the plurality of residual blocks each includes a batch regularization layer which performs batch regularization.

11. The method according to claim 1, wherein the estimated image is generated by a weighted mean of the first intermediate image and the second intermediate image.

12. The method according to claim 1,
wherein the generator is a machine learning model which is trained using a loss including a first loss and a second loss,
wherein the first loss is defined based on a difference between the first intermediate image and a ground truth image and a difference between the second intermediate image and the ground truth image, and
wherein the second loss is defined based on a discrimination result of whether the second intermediate image is an image generated by the generator.

13. The method according to claim 12,
wherein the loss further includes a third loss which is defined based on a discrimination result of whether the first intermediate image is an image generated by the generator, and
wherein a ratio of the third loss to the loss is smaller than a ratio of the second loss to the loss.

14. A non-transitory computer-readable storage medium storing a program for causing a computer to execute the method according to claim 1.

15. A method for learning, the method comprising:
acquiring a low resolution image and a high resolution image corresponding to the low resolution image;
converting the low resolution image into a first feature map and generating a first intermediate image and a second intermediate image from the first feature map, the first intermediate image and the second intermediate image each having resolution higher than resolution of the low resolution image, by using a generator;
discriminating, by using a discriminator, whether an image input to the discriminator is an image generated by the generator; and
training the generator based on a loss including a first loss and a second loss,
wherein the first loss is defined based on a difference between the high resolution image and the first intermediate image and a difference between the high resolution image and the second intermediate image, and
wherein the second loss is defined based on a discrimination output of the discriminator in a case where the second intermediate image is input to the discriminator.

16. The method according to claim 15,
wherein the loss further includes a third loss which is defined based on a discrimination output of the discriminator in a case where the first intermediate image is input to the discriminator, and
wherein a ratio of the third loss to the loss is smaller than a ratio of the second loss to the loss.

17. The method according to claim 15, further comprising converting an image into a feature map using a feature extractor,
wherein, in the training the generator, the generator is trained based on a fourth loss based on a difference between a second feature map converted from the high resolution image by the feature extractor and a third feature map converted from the second intermediate image.

18. A non-transitory computer-readable storage medium storing a program for causing a computer to execute the method according to claim 15.

19. An image processing apparatus comprising a processing unit configured to generate an estimated image obtained by performing resolution enhancement on an input low resolution image,
wherein the processing unit executes:
converting the input low resolution image into a first feature map and generating a first intermediate image and a second intermediate image from the first feature map, the first intermediate image and the second intermediate image each having resolution higher than resolution of the low resolution image, by using a generator which is a machine learning model; and
generating an estimated image having higher resolution than the resolution of the low resolution image based on the first intermediate image and the second intermediate image,
wherein the generator includes an upsampling layer and one or more linear sum layers,
wherein the upsampling layer upsamples an input to the upsampling layer,
wherein each of the linear sum layers outputs a linear sum of an input to the linear sum layer and weights of the linear sum layer, and
wherein a number of the linear sum layers is less on an output side of a first upsampling layer which is closest to the output side of the generator among upsampling layers included in the generator than on an input side of the first upsampling layer.

20. A learning apparatus comprising a processing unit configured to train a machine learning model,
wherein the processing unit executes:
acquiring a low resolution image and a high resolution image corresponding to the low resolution image;
converting the low resolution image into a first feature map and generating a first intermediate image and a second intermediate image from the first feature map, the first intermediate image and the second intermediate image each having resolution higher than resolution of the low resolution image, by using a generator;
discriminating, by using a discriminator, whether an image input to the discriminator is an image generated by the generator; and
training the generator based on a loss including a first loss and a second loss,
wherein the first loss is defined based on a difference between the high resolution image and the first intermediate image and a difference between the high resolution image and the second intermediate image, and wherein the second loss is defined based on a discrimination output of the discriminator in a case where the second intermediate image is input to the discriminator.

\* \* \* \* \*